Nov. 15, 1949  J. BUDAY  2,488,077
ROTATABLE TABLE SAWING MACHINE
Filed Sept. 15, 1944  5 Sheets-Sheet 1

Inventor
John Buday
by Parker & Carter
Attorneys.

Inventor
John Buday
by Parker & Carter
Attorneys

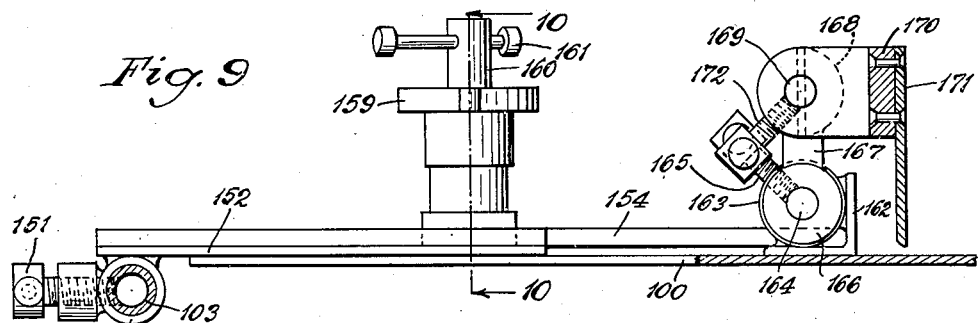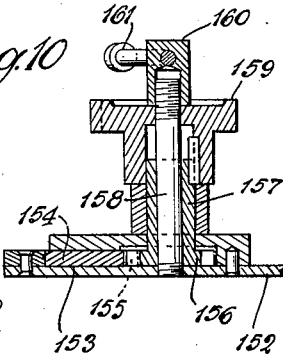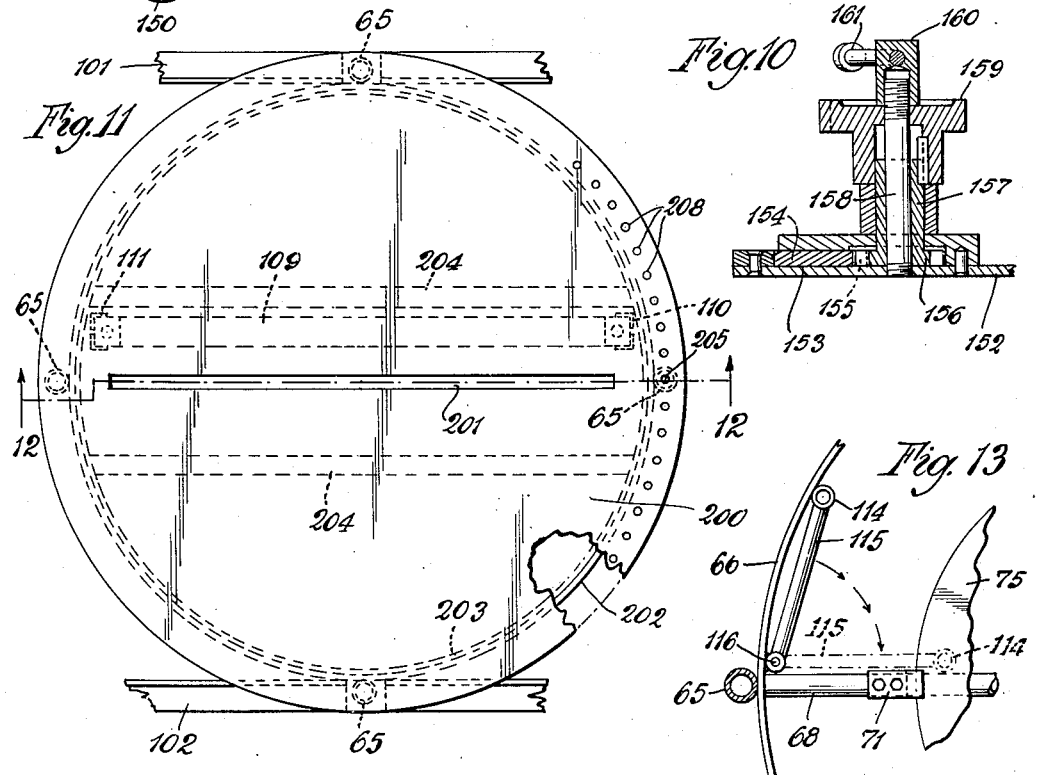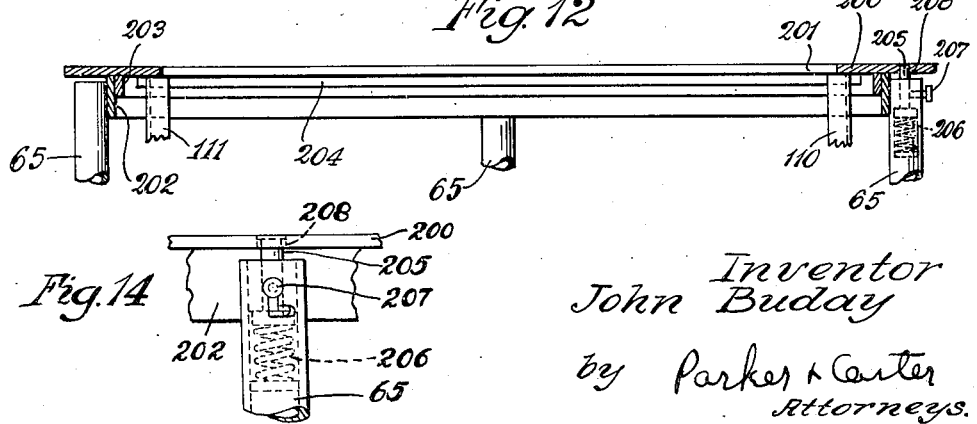

Patented Nov. 15, 1949

2,488,077

UNITED STATES PATENT OFFICE 2,488,077

ROTATABLE TABLE SAWING MACHINE

John Buday, Milwaukee, Wis.

Application September 15, 1944, Serial No. 554,221

3 Claims. (Cl. 143—6)

1

My invention relates to improvements in that type of sawing machines employed for cutting or sawing through a piece of work at various angles.

Carpenters and others, using existing power saws, are frequently handicapped in making angle cuts where space is limited. It is frequently desirable to install the saw in a narrow corridor within a building under construction, and extended saw tables may prevent such installations or interfere with desired installations, since elongated pieces of work can be brought to the saw only in one direction along a narrow corridor.

My object is to simplify the sawing equipment, reduce the space which it occupies, facilitate the adjustment of the saw and saw table at different angles, and make possible the sawing and trimming of work pieces in compartments or corridors in which ordinary sawing equipment can be installed, but cannot properly function.

Another object is to provide improved work guiding means for a power saw.

Another purpose is to provide a saw and a mounting therefor which includes a table having a free edge.

Another purpose is to provide improved means for guiding and actuating a rotary saw in connection with such a table.

Another purpose is to provide improved means for adjusting the work engaging or guiding means associated with a power saw.

Other purposes will appear from time to time in the course of the specification and claims.

The present application is a continuation in part of my application 435,369 for Sawing machine filed in the United States Patent Office on March 19, 1942, passed to issue March 25, 1944 and forfeited.

In the drawings:

Figure 9 is a section on the line 9—9 of Figure 5.

Figure 10 is a section on the line 10—10 of Figure 9.

2

Figure 11 is a plan view illustrating a variant form of table, and

Figure 12 is a section on the line 12—12 of Figure 11.

Figure 7:
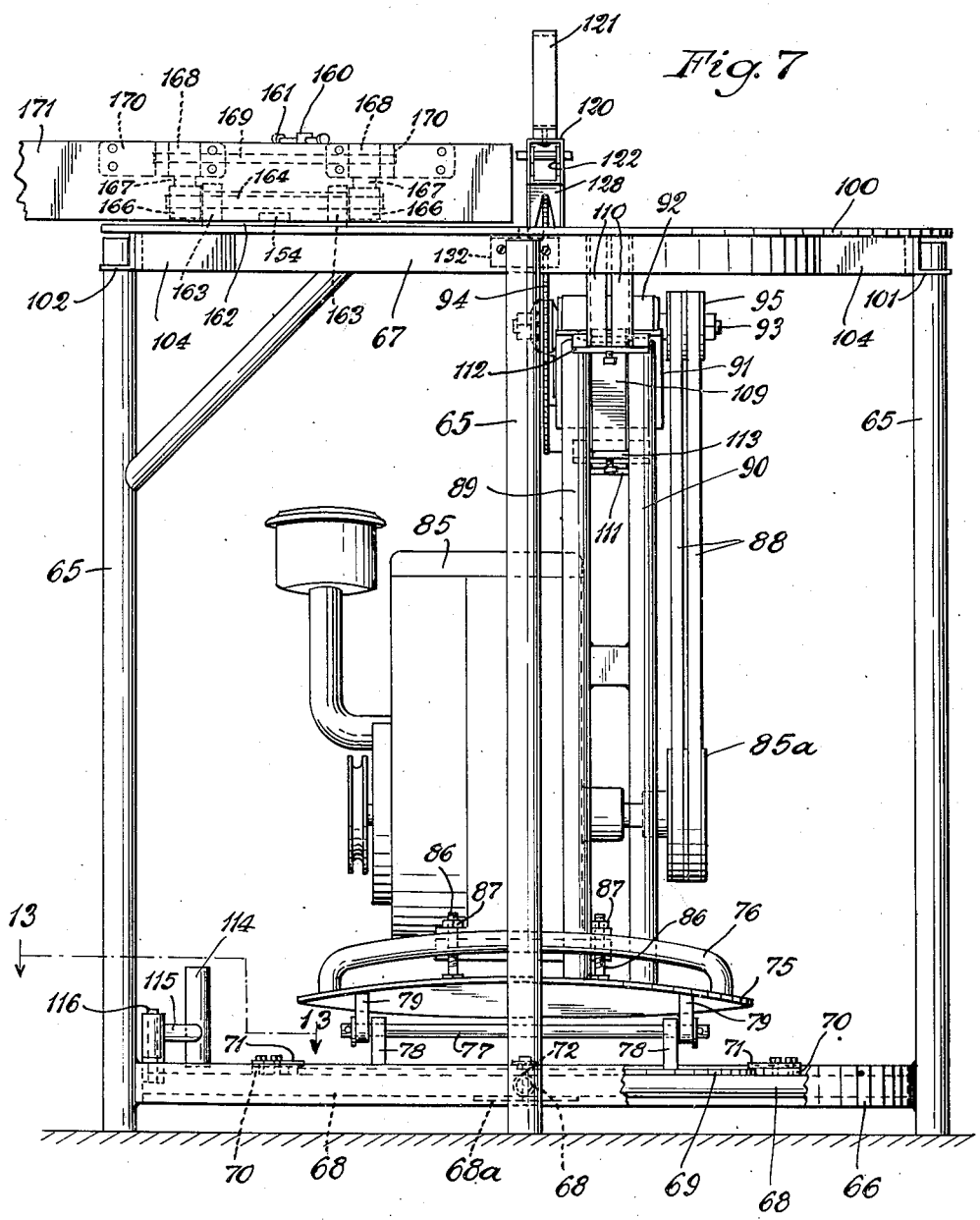
Figure 7 is an end elevation with parts broken away.
Figure 8:
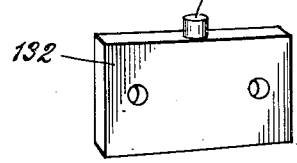
Figure 8 is a detail.

Figure 13 is a section taken on the line 13—13 of Figure 7; and

Figure 14 is a detail of the locking means shown in Figure 12.

Like parts are identified by the same reference characters throughout the several views.

Referring first to the form of Figures 1 to 4, the frame comprises a set of upright posts 10 and 11, which carry a raised base 12 and a top ring 13, having an inwardly projecting plate-like bracket 14 which, in the construction shown, occupies substantially the rear right-hand quarter of the space within the ring. At the front I provide a transverse mounting shaft or rod 15 to which one or more fences or work guides 16 or 17 may be secured. The fence 16 has a carrying arm 18 provided with a sleeve 19 adjustable upon the rod 15. The sleeve may be secured to the rod by a set screw 20.

The fence 17 has a carrying arm 18' provided with a cross-bored block 22 at its lower end adapted to receive the rod 15 in either bore, whereby the fence may be adjusted in either of two positions at right angles to each other. A set screw 23 secures the block to the rod in the desired position of adjustment.

A rotary disk 25 serves as the table top. It has a centrally disposed pivoted stud 26 journaled in the inner corner portion of bracket plate 14, and at one side of the center the table top is provided with a slot 28, (Figure 3), through which the working portion of a saw 29 projects.

Figure 2:
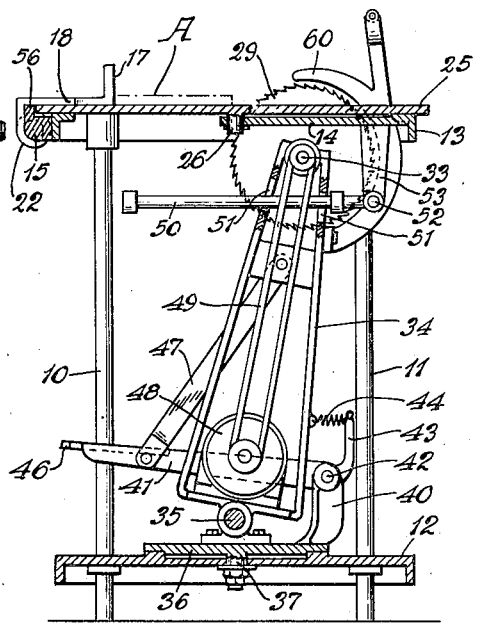
Figure 2 is a sectional view drawn to line 2—2 of Figure 1.

The saw 29 has its arbor 33 journaled in the upper end of a frame 34, the lower end of which is pivotally mounted at 35 on a turntable 36, pivoted to the base 12 by a king bolt 37. The turntable has a bracket 40 to which a foot lever 41 is pivoted at 42. The bracket has an upwardly projecting arm 43 connected with the frame 34 by a spring 44, whereby the frame and the saw are held in the retracted position, as illustrated in Figure 2. The lever has a foot pedal 46 at its front end and is intermediately connected with the frame 34 by a link 47, whereby downward pressure on the foot pedal will feed the saw into the work.

A motor 48 operates the saw through a belt or chain 49 extending over suitable pulleys on the motor shaft and saw arbor, respectively.

Figure 3:
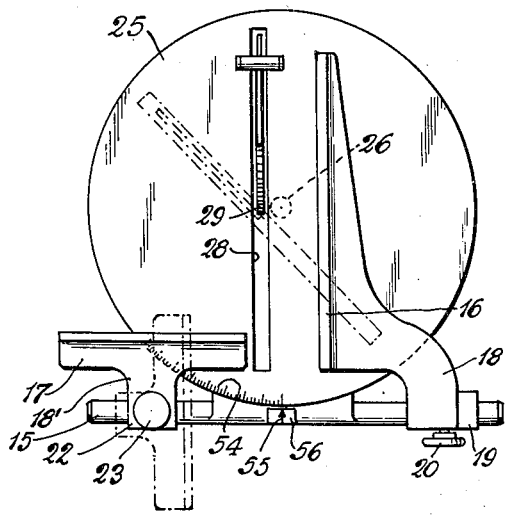
Figure 3 is a plan view.
Figure 4:
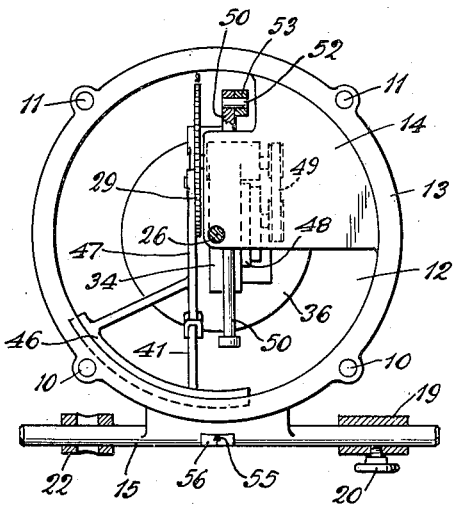
Figure 4 is also a plan view, with the table top removed.

The table top 25 and the turntable 36, with the frame 34 and saw, may be rotatably adjusted upon the king bolt 37 by means of a lever 50 which extends through slots 51 in the frame 34, with its rear end pivotally connected at 52 to an arm 53 depending from the table top 25. Therefore the saw may be instantly adjusted from a position parallel to the working face of the fence 16, as shown in Figure 3, or to a position at an angle thereto, as indicated by dotted lines in said figure.

The table top 25 may be provided with gauge marks 54 for use in association with an index pointer 55 to indicate the position of the saw. The pointer 55 is preferably located on an arm 56 projecting upwardly from the rod 15.

Figure 1:
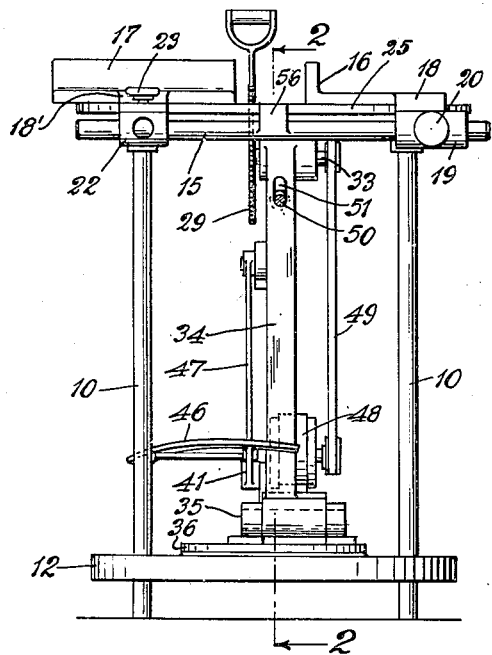
Figure 1 is a front elevation of a sawing machine embodying my invention.

Work pieces A may be fed to the saw longitudinally along the fence 16, and, if desired, the fence 17 may be adjusted at right angles to its position in Figure 1 to hold the longitudinally moving work to the fence 16. For cross cutting, the table, saw, and frame 34 will be rotated a one quarter turn and the fence, or fences, adjusted accordingly.

When the work is being fed longitudinally it will be moved against the saw by the operator and the treadle 46 will not be actuated, whereas for cross cutting the saw will be fed through the work by operating the treadle 46 in the well-known manner. The table 25 is not only held in a horizontal plane by its pivot pin 26, but by the stationary ring 13 carried by the posts 10. The guard 60 may be of any ordinary type.

The treadle 46 is preferably made arcuate and located within the circle defined by the posts 10, whereby it may be swung with the saw carrying frame through an arc of about 90° without withdrawing all portions of it from in front of the operator, or requiring the operator to shift his position in order to feed the saw into the work from different angles.

Figure 5:
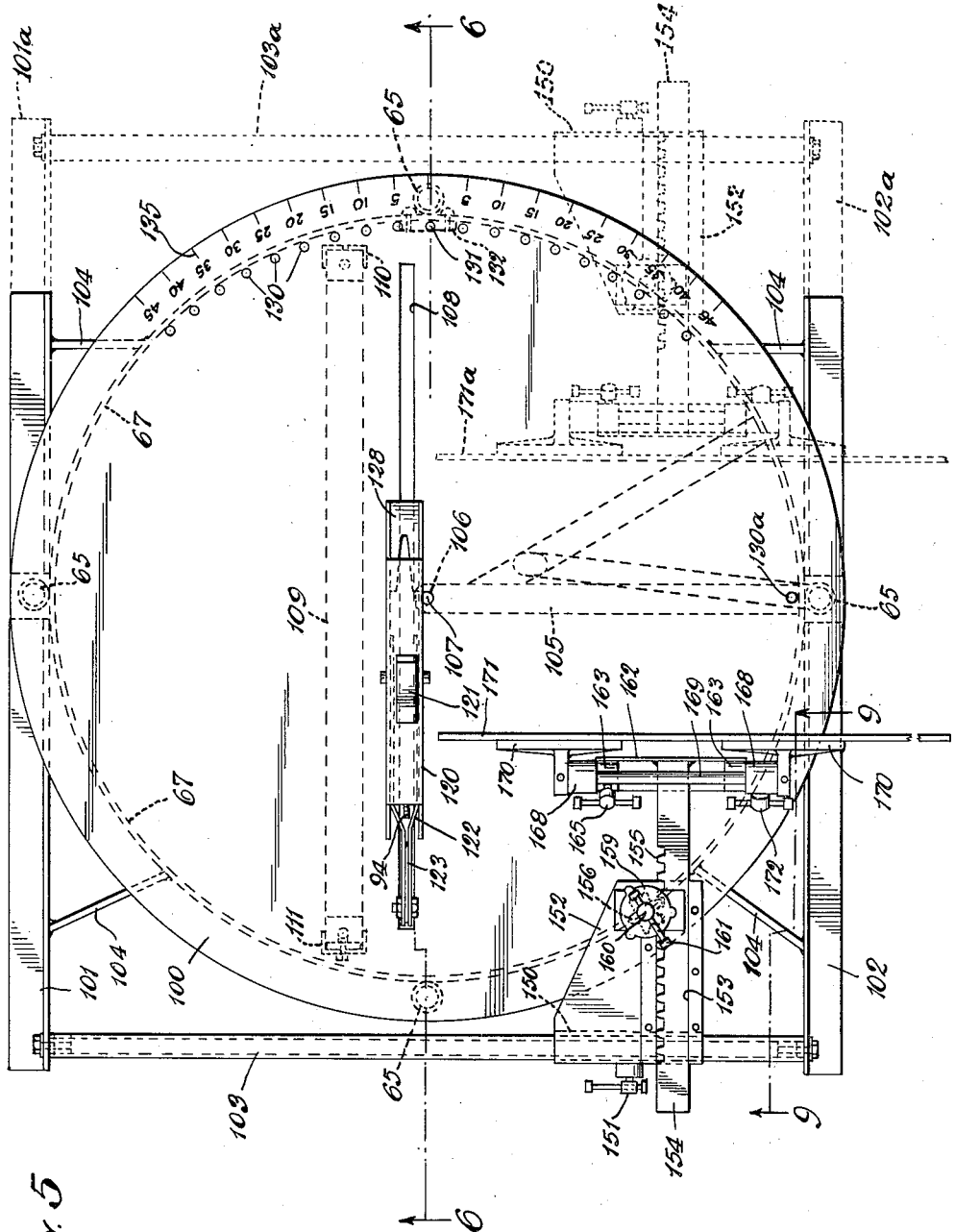
Figure 5 is a plan view of another form of my invention.

Referring to the form of Fig. 5 and following, 65 designates upwardly extending frame members or supports which may be of any suitable cross section and are shown as connected adjacent their lower ends by any suitable circumferential frame member, such as a ring 66. A top connecting ring 67 may also be employed. Within the bottom ring 66 I provide a plurality of radially extending tubular members 68 which may be connected at their centers and have a supporting or connecting plate 68a. Resting upon the cross members 68 is a turn table plate 69 the edges of which may be secured and guided by any suitable abutments 70 with overhanging plates or securing members 71. 72 is any suitable central pivot or pin mounted on the cross bars 68 and penetrating the center of the plate 69.

Mounted upon the base plate or turn table plate 69 is an adjustable tilting plate 75 provided at one edge with the generally arcuate pedal structure 76. It is shown as pivoted as at 77 to the plate 69. I may employ, for example, lugs 78 upwardly extending from the plate 69 and lugs 79 downwardly extending from the plate 75, to receive the pivot pin or bar 77. The downward limit of movement of the edge of the plate 75 opposite to the pedal 76 may be adjusted by any suitable abutment means. I illustrate for example an adjusting limit screw 80 controlled by a knob 81, provided with any suitable lock nut structure 82.

Figure 6:
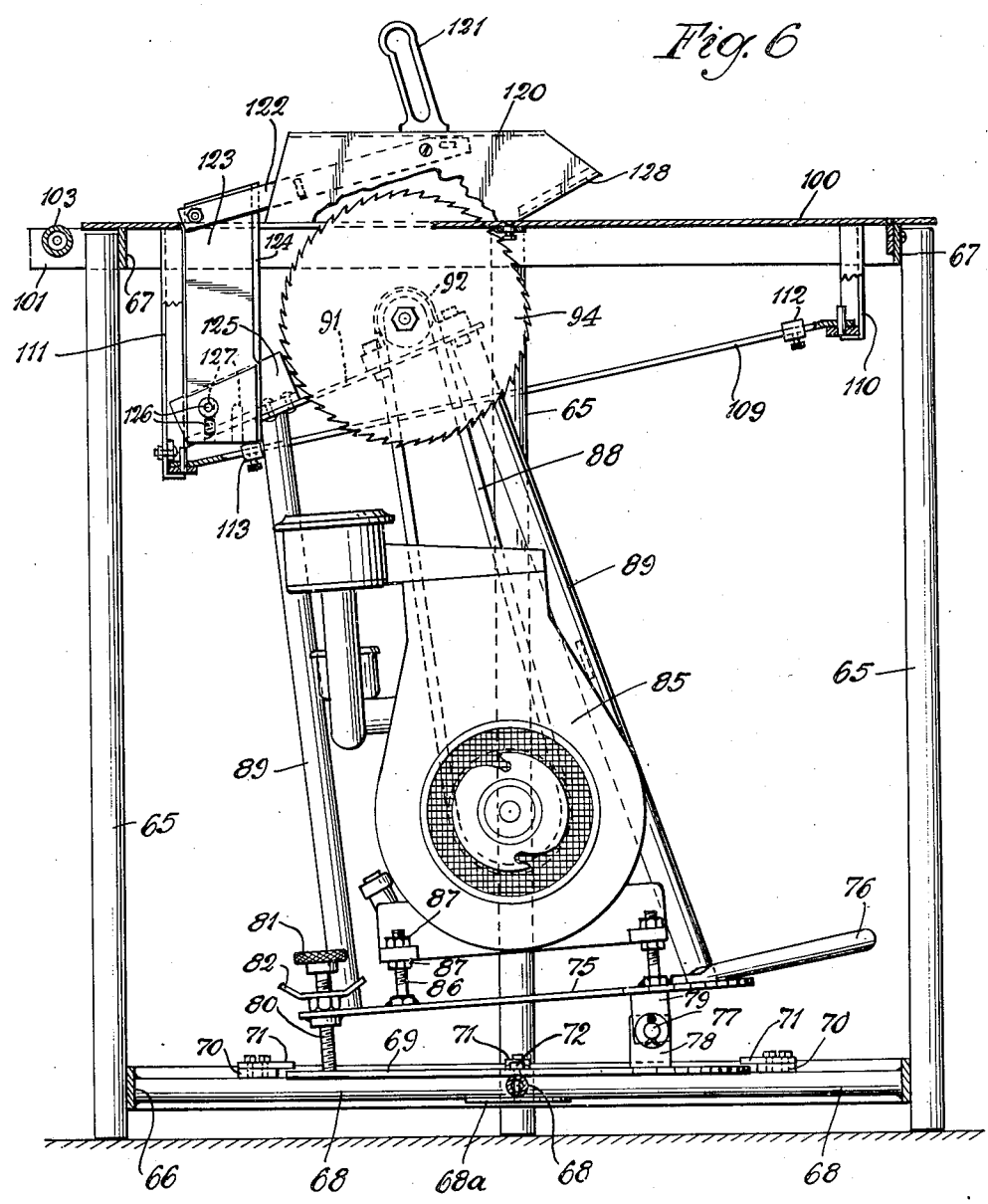
Figure 6 is a section on the line 6—6 of Figure 5.

Mounted on the plate 75 is any suitable motor or engine generally indicated as 85, the details of which do not of themselves form part of the present invention. I have illustrated diagrammatically an internal combustion engine. It will be understood that an electric motor may be employed if desired. Any suitable means for mounting the motor or engine on the plate 75 may be employed, and preferably the plate is formed to receive alternatively an electric motor or an internal combustion engine. With reference to the internal combustion engine mounting as shown in Fig. 6 I may employ bolts 86 the heads of which may be welded or otherwise secured to the plate 75. The motor base may be adjusted to the bolts 86 as by any suitable nuts 87, 87 which may also be employed as adjustable takeup means for the driving belt 88. Upwardly extending from the plate 75 is a saw supporting structure. It may include for example the pairs of parallel laterally spaced supports 89, 90. 91 is any suitable cross plate carrying any suitable saw bearing or bearings 92 for the saw shaft 93 which carries the saw 94 and the saw pulley or pulleys 95 about which pass the belt or belts 88 driven from the pulley 85a of the engine 85. Two sets or pairs of supports, 89, 90, may be employed, as will be clear from Figs. 6 and 7. 100 is a rotatably adjustable table the edges of which rest upon and are supported by the top circumferential frame member 67.

In addition to the top frame member 67, I employ a pair of horizontal top frame members 101, 102 as shown for example in Fig. 5. At their outer ends they may be connected for example by the transverse support 103 which is in the form of a rod. If desired, as shown in dotted line in Fig. 5 the members 101, 102 may be extended at their opposite ends as at 101a, 102a and may be connected by a second transverse rod like support 103a. Any suitable intermediate supports 104 may be employed extending to the top ring 67.

The table 100 may be additionally supported, at its center by any suitable bracket 105 having at its end any suitable socket portion 106 adapted to receive a downwardly extending pin or bearing or centering member 107 on the table. Thus the table is constrained to movement about its center, is supported at its edges by the circumferential member 67, and is additionally supported at its center by the bracket 105. The table is provided with a transversely extending slot 108 of substantial length and slightly off center, in order to clear the pin 107.

The movement of the saw supporting and tilting structure, including the member 75 and the vertical supports 89, 90, is guided by a member 109 which extends between the pairs of upright supports 89, 90. The member 109 may be mounted at its forward end in any suitable support or bracket 110 depending from the bottom of the table 100 and is supported at its rearward end by a similar but longer bracket 111. Thus the member 109 is inclined somewhat and roughly conforms to the path which the saw takes as the base member 75 is tilted by pressure upon the pedal 76. Any suitable abutment members may be movably mounted on the member 109, as indicated at 112 and 113, in order to permit the total possible arc of movement of the saw frame to be limited at either end of its course. The member 113 may be additional to the adjusting screw 80, or one or the other may be omitted.

Any suitable means may be employed for holding the saw at an intermediate position along the slot 108. I may for example employ an abutment 114 mounted on an arm 115 pivoted as at 116 on the lower frame ring 66. See Figs. 7 and 13. When the above mentioned abutment member is swung into position the lower disc 75 rests gravitationally upon it and the saw 94 is located substantially midway between the ends of the slot 108, a position which is convenient when long boards are being ripped.

In addition to the employment of the pedal 76 I may employ a saw guard and handle as means for drawing the saw along the slot 108 and toward the work. I therefore provide a saw guard 120 with its handle 121. The guard may be pivoted to a link or fork 122 which in turn is pivoted to a thin blade or support 123 the upper end of which extends through the slot 108 and is preferably of no greater width than the saw 94 and has a forward knife edge 124.

The member 123 is secured at its lower end to the plate 91 as by any suitable bracket 125. Any suitable securing bolts 126 may be employed. The member 123 is shown with a plurality of bolt receiving slots 127, whereby adjustment is permitted toward and away from the saw 94. It will be noted that the forward end of the guard 120 is inclined as at 128 to permit it to override the work. The table top 100 is adjustable in order to adjust the angle of the slot 108 in relation to the fixed base structure. Any suitable adjusting means may be employed but I herein illustrate a series of apertures 130 adapted to receive an upwardly extending adjusting pin 131 which may be on any suitable block 132 secured to the top frame ring 67. It will be understood that the table 100 may be sufficiently flexible to permit it to be lifted slightly to clear the pin 131 if the pin is fixed. It will be understood that the block 132 may be mounted for limited movement in relation to the ring 67, in order that the user may move the block and avoid the necessity of flexing the table top 100. In addition to or as a substitute for the apertures 130, I may provide any suitable graduation as shown at 135 in Fig. 5. In that event any suitable pointer may be employed such as is shown at 55 in Fig. 3 and is omitted from Fig. 5.

Mounted on the fixed frame structure but overlying the rotary table 100 is the below described work engaging and guiding structure. It may include a sleeve 150 slidable along the member 103. Any suitable locking means such as the clamp handle 151 may be employed for locking the sleeve 150 at any desired adjustment. Laterally extending from the sleeve 150 is the bracket portion 152 which may normally overlie the edge of the table. It is provided with any suitable slot 153 to receive the longitudinal slide member 154 having teeth 155 along one side which mesh with corresponding teeth in a gear 156 on the sleeve 157 which rotates about the pin 158 and can be rotated for example by the manual knob or handle 159. See Figs. 5, 9 and 10. The knob 159, and thus the gear and slide member 154, may be locked at any desired position by the clamping sleeve or lock nut 160 with its handle 161. At the ends of the slide 154 is a transverse angle 162, to which are secured a pair of bearing blocks 163. These receive a pin 164 which may be locked against rotation by any suitable locking element 165. The pin 164 also carries hubs 166 fixed thereto, with arms 167 carrying sleeves 168 through which passes a pin 169 carrying brackets 170 secured to any suitable work abutment or blade 171. 172 is any suitable locking means for the pin 169. Thus it will be seen that I provide a work engaging or guiding member which may be moved toward or away from the center of the table by the adjustment of the slide 154. The blade 171 may be tilted to any desired position of adjustment and may be locked in tilted position or may be locked in vertical position. The entire work guiding mechanism may also be adjusted along the rod 103 and, if desired, it may be rotated on the rod 103 and swung into inoperative position and out of vertical alignment with the table 100. It will be understood also that if desired a similar work guiding assembly may be mounted on the rod 103a. If the dotted line structure illustrated in Fig. 5 is added, the guide 171a is positioned to receive the work as the work tends to be thrust thereagainst when the saw is moved for the cutting excursion by the depression of the pedal 76 or by a direct pull on the handle 121 or both. In practice identical guiding means may be positioned at each end of the frame or a single guiding assembly may be positioned at either end of the frame.

When ripping, it is desirable to rotate the table 100 until the aperture 130a receives the positioning pin 131.

It will be noted that the table 100 has a free edge and this edge may be employed as means for rotating the table and also the saw structure as a whole. When the table is rotated, the guide 109 constrains the saw supporting structure to rotate with the table. Thus when the table 100 is rotated the bottom plate 69 is also rotated. It will be understood that any additional holees may be employed about the circumference of the table 100, to suit any particular need. The range of holes 130 and 130a herein shown however constitute a practical means of adjustment. It will be understood that the guard 120 can be tilted into inoperative position or it can readily be entirely removed, which may be advantageous when ripping. However, when the saw is positioned in intermediate position for ripping, the blade 123 is sufficiently elevated to permit the link 122 to clear the work being ripped. The blade 123 passes between the two sawed parts and may be advantageous in maintaining them slightly separated.

It will also be understood that the table top may be supported at its edges only. I illustrate for example in Fig. 11 and Fig. 12 a variant structure in which the table 200 is provided with a slot 201, which may, if desired, extend through the center of the table. The table rests at its edges on the circumferential frame member 202 but may be centered for example by a circumferential downwardly extending flange 203. If desired, any suitable reinforcements 204 may extend across the flange or ring 203 to provide intermediate support for the table top itself. Any suitable locking pin 205 may be employed normally yieldingly upwardly thrust by a spring 206, but adapted to be locked in position by any suitable lock 207. 208 indicates any suitable adjustment holes or apertures in the table top, which may extend all the way through the top or may constitute merely recesses in the bottom of the table as desired.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

In all forms of my invention herein shown, I illustrate a table having a free edge, so that the table itself can be manually moved about its vertical axis, to adjust the direction of the saw and saw slot in relation to the work to be fed against it, the free edge acting as an easily accessible handle. In both forms of the device work guiding means are movably and adjustably mounted on the normally fixed support and can be swung into position upon the table top. They are then supported by the table itself. Since the guiding means are mounted on the fixed support, rotation of the table top adjusts the angle of the slot in relation to the guiding means. The angle of the guiding means can also be adjusted, to permit cutting a bevel. In both forms of the device the saw, and the frame on which it is supported, can be traversed to move the saw along the slot toward the work to be sawed. Also, the saw and its support can be held in predetermined position, with the saw intermediate the end of the slot and the work can be fed against it, as when ripping a long board.

Referring more particularly to the form of Figs. 5 and following I provide a fixed frame or base structure including the vertical supports 65, the bottom ring 66 and the top ring 67. Rotatably mounted on the cross supports 68 is any suitable turntable structure which may include the bottom disc 69. Tiltably mounted on it, and rotatable with it about a vertical and generally central axis, is the disc or supporting plate 75. On the supporting plate the saw supporting and actuating means are mounted. In cross cutting the saw, during rotation, may be traversed along the slot 108. This traversing may be obtained by a downward thrust of the foot on the pedal 76 or by pulling the handle 121 or by both simultaneously. In cross cutting it is in general desirable to move the saw against the work. The work may be held against the guide 171 or 171a by the hand of the operator. It will be understood that the table 100 may be set at any desired angle in relation to the guide, so that the cut may be perpendicular to the face of the guide 171 or may be inclined at any suitable angle thereto. If the guide is positioned in the full line position of Fig. 5, the work is thrust manually against the guide and against the direction of draw of the saw. If the guide is positioned in the dotted line position of Fig. 5, the movement of the saw toward the work tends to urge the work against the guide, which in some circumstances is preferable. In ripping it is generally desirable to set the saw at intermediate position in the slot 108. It is preferable to rip in parallel with the guide and therefore the table 100 may be rotated through an angle of 90 degrees from the position in which it is shown in Fig. 5. The rotation of the table moves the entire saw structure and aligns the slot 108 in parallel with and along one edge of the bracket 105. The slot 108, being slightly off center, extends to one side of and parallel with one edge of the bracket 105.

When bevelling, the blade 171 is set at the angle to the perpendicular and will support the work in such fashion as to cause the saw blade to cut a bevel along one corner of the board.

By means of the set screw 80 shown in Figure 6, it is possible to either raise or lower the saw in relation to the table top. When the saw has been lowered so that, for example, it only protrudes above the table top one-half inch, it can be used as a rabbeting saw either for cross-cutting or ripping.

My device is particularly well adapted as a handy service saw for carpenters. It is useful, for example, in restricted areas, such as narrow rooms or halls. If desired, supplemental tables or supports, of approximately the same height as the rotary table, may be positioned at one or both sides of the rotary table, for the support of long boards. No such structure is illustrated in the drawings, since a wide variety of such tables or supports or horses can be employed. My saw assembly lends itself very well to being positioned between two such tables or supports, when ripping long boards.

In the operation of the device it should be kept in mind that my equipment can be installed in corridors or compartments or limited spaces where ordinary sawing equipment cannot function when cutting angles because there would not be enough space to handle long pieces of lumber. In the use of my device, the lumber, in long pieces, may be arranged in restricted spaces, such as narrow halls, parallel with the length of the space. The table which carries the saw can be set to any desired angle, so that the long pieces can be cross cut or ripped or cut at any desired angle.

It will also be understood that an electric motor or internal combustion motor or any other suitable motive power may be employed. I may find it desirable to provide a rotary base properly formed and punched to take either an internal combustion engine or an electric motor depending upon which the customer requires. In either event, and particularly in connection with the gasoline motor, the motor is directly associated with the frame of the saw at a short distance from the saw, with a maximum efficiency of drive.

The fence or guide 171 in Figure 5 can be set so that its length is parallel to the saw protruding through the table top when the saw is used for ripping. When the table top is turned through a ninety degree angle, the fence or guide 171 has its long dimension perpendicular to the face of the saw and acts in this position when the user is using the saw to cross-cut. When the member 171 has its long dimension parallel with the face of the saw as when ripping, the face of the member 171, may be perpendicular to the horizontal or may be set at an angle. In the latter case when lumber is fed to the saw, the lumber may be inclined to the horizontal table top and supported by the fence or guide 171 for the beveling of the lumber as sawed. This is an important feature when using the saw for completing forms for concrete.

I claim:

1. In a sawing machine, a fixed bottom frame, a fixed top frame, and fixed connections therebetween, a top plate rotatably supported on the top frame, a turntable rotatably supported on the bottom frame, an intermediate frame pivoted to said turntable for rotation about a generally horizontal axis, a sliding connection between the intermediate frame and the top plate including opposed elements on intermediate frame and top plate adapted to guide, in a perpendicular plane, a movement of the upper end of said intermediate frame about its pivotal connection to the turntable, a saw rotatable on said intermediate frame, a motor on said intermediate frame, and a driving connection therebetween, said plate being slotted to permit traversing of said saw across said plate, said sliding connection constituting the sole actuating connection for rotating said plate in response to rotation of said turntable, and for rotation of said turntable in response to rotation of said plate.

2. The structure of claim 1 characterized by and including a top plate having a free edge, the top frame lying below said top plate.

3. The structure of claim 1 characterized by and including a bracket inwardly extending from said top frame and a pivotal connection between the bracket and the top plate, the slot of the top plate being laterally offset from the pivotal connection.

JOHN BUDAY.

REFERENCES CITED

The following references are of record in the file of this patent:

UNITED STATES PATENTS

| Number | Name | Date |
|---|---|---|
| 946,032 | Greaves | Jan. 11, 1910 |
| 1,319,272 | De Mars | Oct. 21, 1919 |
| 1,584,086 | Fonda | May 11, 1926 |
| 1,686,246 | Murner | Oct. 2, 1928 |
| 1,796,697 | White | Mar. 17, 1931 |
| 1,816,069 | Bennett | July 28, 1931 |
| 2,064,607 | Hirtz | Dec. 15, 1936 |
| 2,175,907 | Mickow | Oct. 10, 1939 |
| 2,208,582 | Hollister | July 23, 1940 |
| 2,247,314 | Sellmeyer | June 24, 1941 |
| 2,310,813 | Sellmeyer | Feb. 9, 1943 |

FOREIGN PATENTS

| Number | Country | Date |
|---|---|---|
| 47,581 | Germany | June 22, 1889 |
| 15,177 | Great Britain | July 1, 1913 |